Nov. 9, 1926. 1,606,426
J. J. JUSTEN
AIR VALVE FOR HOISTS
Filed Sept. 10, 1925
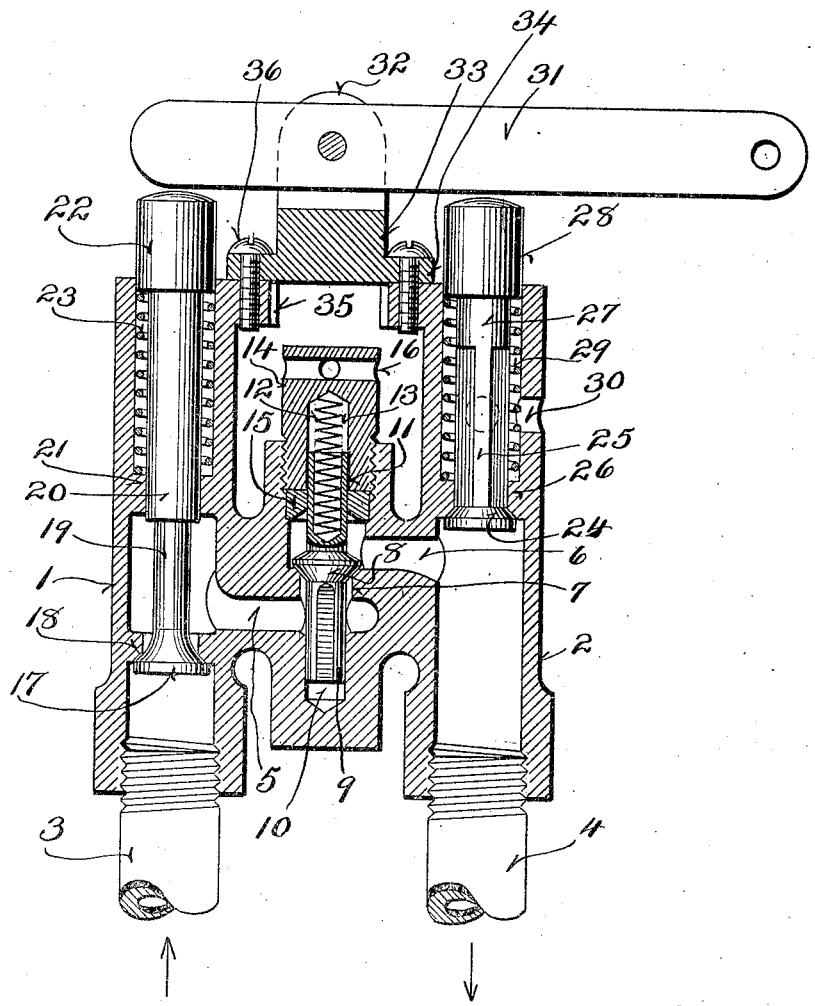
Inventor
Joseph J. Justen Patented Nov. 9, 1926.

1,606,426

UNITED STATES PATENT OFFICE.

JOSEPH J. JUSTEN, OF MILWAUKEE, WISCONSIN.

AIR VALVE FOR HOISTS.

Application filed September 10, 1925. Serial No. 55,578.

This invention relates to valves, and is particularly directed to an air valve for a hoist. In general this invention is an improvement over that disclosed in my United States Patent Number 1,258,342, for air valve for hoists, issued March 5, 1918, and has the same general objects as those disclosed in such patent.

Further objects are to provide an air valve for hoists or for other purposes which is so constructed that the valves will not chatter or move out of their desired axial position, in which correct seating of each of the several valves in the device is assured, in which means are provided for preventing escape of air from the hoist to the air supply although the pressure in the air supply system may fall.

Further objects are to provide a valve for an air hoist in which the inlet and outlet valves are operated by a lever or similar mechanism, in which the support for the lever is independent of the other structure in the apparatus, and may be left undisturbed although adjustments may be made in other portions.

Further objects are to generally simplify and improve the construction of this type of valve and to provide a device which may be readily machined and easily produced.

An embodiment of the invention is illustrated in the accompanying drawings, in which:—

The single figure is a sectional view through the valve.

Referring to the drawings, it will be seen that the valve comprises a casting having two main tubular portions 1 and 2, whose lower ends are connected, respectively, to the air supply pipe 3, and to the pipe 4 leading to the cylinder. These pipes are preferably threaded into the lower ends of the tubular members 1 and 2. These members 1 and 2 are connected by means of an integral portion of the casting provided with a duct 5 communicating with the interior of the tubular member 1, and with a duct 6 communicating with the interior of the tubular member 2. An aperture 7 connects the ducts 5 and 6, and a valve seat is formed at the upper portion of this aperture. A check valve 8 is provided and cooperates with the valve seat to control communication between the ducts 5 and 6. This valve is preferably provided with an integral downwardly extending stem 9 seated within and guided by a socket 10. Preferably, this stem is provided with a flattened portion or cutaway portion to prevent pocketing of the air in the socket 10 below the stem.

The upper portion of the valve 8 is provided with a hollow stem 11 within which a small spring 12 is housed. This stem is guided in an aperture 13 formed in the removable plug 14 screw threaded into the transverse web, as shown in the drawings.

Preferably, a washer or auxiliary seat 15 is provided for the check valve 8 and it is to be noted that such washer or seat contacts with a shoulder and is held in place by the screw threaded plug 14. Further, it will be noted that the check valve is provided with a conical upper face adapted to cooperate with the seat 15 and limit upward motion of the check valve. Thus, although air pressure may be suddenly applied to the check valve, no damage will result as the seat 15 will cooperate with the valve to arrest further upward motion. Preferably, the plug 14 is provided with a series of apertures 16 therethrough adapted to receive a manipulating rod or pin in positioning or removing the plug.

The inlet valve is indicated at 17, and cooperates with the valve seat 18 formed in the tubular member 1. It is provided with a shank 19 of reduced size which joins a larger cylindrical shank 20. This larger shank is guided in a web 21 formed in the tubular member 1 and terminates in an enlarged head 22 of cylindrical formation guided in the upper portion of the tubular member 1. A spring 23 loosely surrounds the portion 20 of the stem and bears at its upper end against the head 22, thus urging the valve toward closed position.

The exhaust valve is indicated at 24 and is joined to a star shaped shank 25 guided in the web 26 of the tubular member 2. This star shaped shank joins the cylindrical shank 27 similar to the shank 20 of the inlet valve. The portion 27 terminates in an enlarged head 28 guided in the upper portion of the tubular member 2. A spring 29 loosely surrounds the shank of the exhaust valve and bears at its upper end against the head 28, thus urging the exhaust valve toward closed position. Preferably, a plurality of apertures 30 are provided in the upper portion of the tubular member 2 to permit the escape of air.

The valves may be manipulated in any suitable manner, preferably by means of a lever 31 pivoted between a pair of lugs 32 carried by a bracket 33. This bracket is provided with apertured ears 34 which rest upon apertured lugs 35, the apertures in such lugs being threaded and receiving the attaching screws 36.

It is to be noted that the check valve may be adjusted or removed without disturbing the support for the manipulating lever 31. For example, while the lever and its supporting bracket are left in place, the screw threaded plug 14 may be readily removed and access had to the check valve 8.

It is to be noted also that the check valve is guided by means of upwardly and downwardly projecting stems so that incorrect seating of the valve cannot result.

Further, it is to be noted that the inlet and exhaust valves are guided by means of elongated stems, such stems contacting at widely spaced points with portions of the tubular members.

It will be seen that a very effective air valve for hoists has been provided which may be easily constructed, which is efficient in operation, and in which displacement of the valves cannot occur.

Although the invention has been described in considerable detail, it is to be understood that the invention may be variously embodied and is, therefore, to be limited only as claimed.

I claim:

1. A valve device comprising a pair of tubular members, each of said members having a valve therein, an inlet controlled by one of said valves, an outlet communicating with the interior of one of said tubular members, one of said tubular members having apertures normally cut off from the interior of such member by means of the corresponding valve, each of said valves having elongated spindles guided at widely spaced points by said tubular members, resilient means urging said valves toward closed position, a duct connecting the interior of said tubular members, a check valve controlling the flow of fluid through such duct, said check valve having elongated spindles projecting from opposite sides thereof and guided by said valve device, said valve device having a threaded aperture adjacent said check valve, a threaded plug screwed into said aperture and having a hole therein for the reception of one stem of said check valve, a lever pivoted transversely of the outer ends of said first mentioned valves, and a support for said lever carried by said valve device, and independent of said screw threaded plug.

2. A valve device comprising a pair of tubular members, each of said members having a valve therein, an inlet controlled by one of said valves, an outlet communicating with the interior of one of said tubular members, one of said tubular members having apertures normally cut off from the interior of such member by means of the corresponding valve, each of said valves having elongated spindles guided at widely spaced points by said tubular members, resilient means urging said valves toward closed position, a duct connecting the interior of said tubular members, a check valve controlling the flow of fluid through such duct, said check valve having elongated spindles projecting from opposite sides thereof and guided by said valve device, said valve device having a threaded aperture adjacent said check valve, a threaded plug screwed into said aperture and having a hole therein for the reception of one stem of said check valve, a lever pivoted transversely of the outer ends of said first mentioned valves, and a support for said lever carried by said valve device and independent of said screw threaded plug, said support being removably held to said valve device and spaced from said screw threaded plug a distance permitting the free removal of such plug without the removal of said support.

In testimony that I claim the foregoing I have hereunto set my hand at Milwaukee, in the county of Milwaukee and State of Wisconsin.

JOSEPH J. JUSTEN.